United States Patent [19]

Yamaguchi et al.

[11] Patent Number: 4,624,883
[45] Date of Patent: Nov. 25, 1986

[54] MAGNETIC RECORDING MEDIUM

[75] Inventors: Satoru Yamaguchi, Kyoto; Kozaburoh Satoh, Kameoka; Jozo Shimizu, Nagaokakyo; Haruo Andoh, Suita, all of Japan

[73] Assignee: Hitachi Maxell, Ltd., Osaka, Japan

[21] Appl. No.: 590,796

[22] Filed: Mar. 19, 1984

[30] Foreign Application Priority Data

Mar. 20, 1983 [JP] Japan ................................. 58-46365

[51] Int. Cl.$^4$ ............................................. G11B 5/70
[52] U.S. Cl. ................................... 428/212; 360/134; 360/135; 360/136; 427/128; 427/131; 428/216; 428/328; 428/329; 428/694; 428/900
[58] Field of Search ............... 428/694, 329, 328, 212, 428/900, 216; 427/131, 128; 360/134–136

[56] References Cited

U.S. PATENT DOCUMENTS

| 4,200,678 | 4/1980 | Pister | 428/329 |
|---|---|---|---|
| 4,246,316 | 1/1981 | Aonuma | 427/131 |
| 4,265,931 | 5/1981 | Tamai | 427/131 |
| 4,323,621 | 4/1982 | Kober | 428/329 |
| 4,409,281 | 10/1983 | Kitamoto | 427/131 |
| 4,410,590 | 10/1983 | Kawahara | 428/694 |
| 4,439,795 | 3/1984 | Kitamoto | 427/131 |
| 4,439,796 | 3/1984 | Kitamoto | 427/131 |
| 4,513,054 | 4/1985 | Kitamoto | 428/693 |

FOREIGN PATENT DOCUMENTS

| 54-48504 | 4/1979 | Japan | 428/694 |
|---|---|---|---|
| 57-69528 | 4/1982 | Japan | 427/131 |
| 57-143734 | 9/1982 | Japan | 428/329 |
| 2042370A | 9/1980 | United Kingdom . | |

Primary Examiner—Ellis P. Robinson
Attorney, Agent, or Firm—Birch, Stewart, Kolasch & Birch

[57] ABSTRACT

A magnetic recording medium which comprises a first magnetic layer on a base and a second magnetic layer over the first magnetic layer, the second magnetic layer containing magnetic particles having an average particle length (long axis diameter) of not more than 0.35μ, with a coercive force of from 660 to 760 oersteds, and the ratio of the coercive force of the upper or second magnetic layer to that of the lower or first magnetic layer being 1.1/1 to 1.6/1. The resulting magnetic recording medium has excellent sensitivity and frequency characteristics over the entire frequency bands with less noise.

5 Claims, 4 Drawing Figures

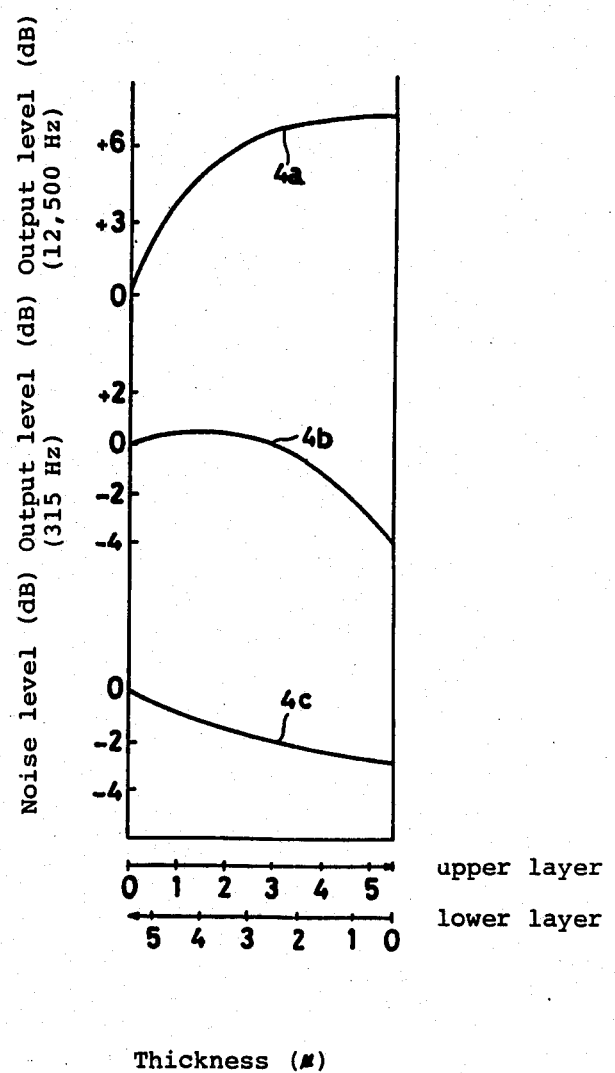

MAGNETIC RECORDING MEDIUM

BACKGROUND OF THE INVENTION

The present invention relates to a magnetic recording medium having two magnetic layers. More particularly, it relates to a magnetic recording medium having an upper magnetic layer of a higher coercive force and a lower magnetic layer of a lower coercive force, which has improved sensitivity and frequency characteristics or high output over broad frequency bands with less noise.

It has been known that, in a magnetic recording medium having two magnetic layers, sensitivity and frequency characteristics at both low and high frequency bands can be improved by making a coercive force of the lower layer low and that of the upper layer high, that is, the output at the high frequency band can be improved by the upper magnetic layer having a higher coercive force and the output at the low frequency band can be improved by the lower magnetic layer having a lower coercive force. Such a magnetic recording medium is usually produced by first applying a magnetic paint composition containing magnetic particles of a relatively lower coercive force onto a base film, such as a polyester film and drying the composition to form the lower magnetic layer, and then applying a magnetic paint composition containing magnetic particles of a relatively higher coercive force onto the lower magnetic layer and then drying the latter composition to form the upper magnetic layer.

However, in such a conventional magnetic recording medium of this type wherein the, sensitivity and frequency characteristics at both the low and high frequency bands are improved by a lower layer of a lower coercive force and an upper layer of a higher coercive force, there is the drawback that the curve of the frequency characteristics slacks at medium band, i.e., the output at the medium band drops.

SUMMARY OF THE INVENTION

The present invention provides an improved magnetic recording medium having two magnetic layers which show excellent sensitivity and frequency characteristics over the entire frequency band with less noise. As a result, it has been found that a magnetic recording medium of two layers having desired improved frequency characteristics and sensitivity over the entire frequency bands, with no slack of the curve of frequency characteristics at the medium band and sufficient lowering of noise, can be obtained by using magnetic particles having an average particle length (long axis diameter) of not more than $0.35\mu$ in the upper magnetic layer so as to obtain the upper magnetic layer having a coercive force of 660 to 760 oersteds, and maintaining the ratio of coercive forces between the upper and lower magnetic layers (i.e. the coercive force of the upper magnetic layer/the coercive force of the lower magnetic layer) within the range of 1.1/1 to 1.6/1.

Therefore, it is an object of the present invention to provide a magnetic recording medium having two magnetic layers of which the curve of the frequency characteristics is not slack at the medium band. Another object of the invention is to provide a magnetic recording medium having two magnetic layers which have improved sensitivity and frequency characteristics or high output over the entire frequency band with less noise.

BRIEF DESCRIPTION OF THE DRAWINGS

These as well as other objects and advantages of the present invention will be apparent to persons skilled in the art from the following description with reference to the accompanying drawings wherein:

FIG. 4 shows the relation between noise level or output level and the ratio of thickness of the upper layer to that of the lower magnetic layer.

DETAILED DESCRIPTION

Figure 1:
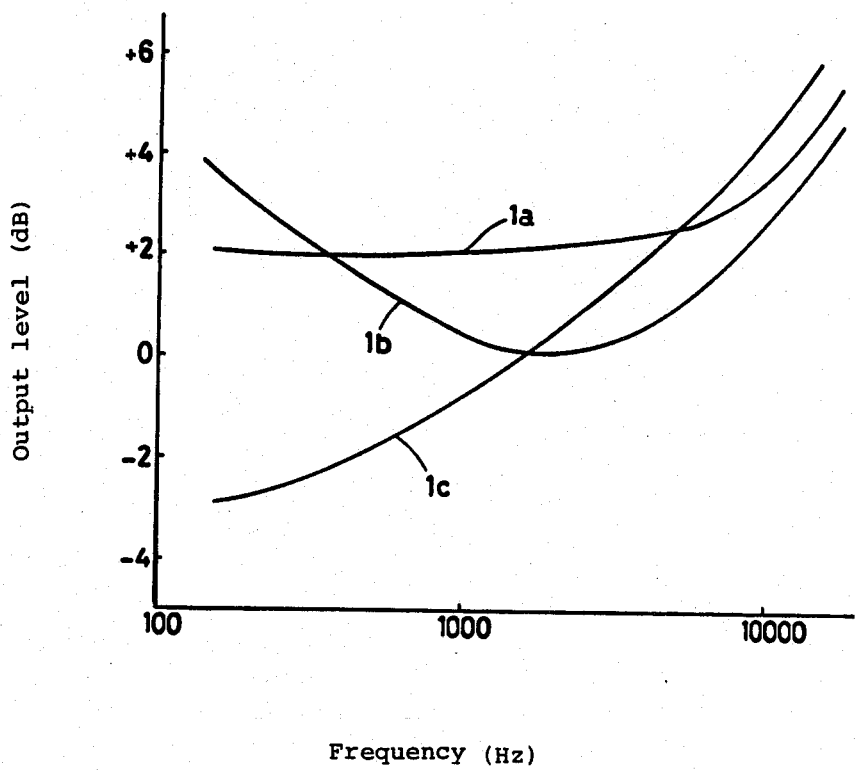
FIG. 1 shows the relation between the output level and frequency at various ratio of coercive force between the upper and lower magnetic layers of the magnetic tape.

According to the present invention, there is provided a magnetic recording medium which comprises a first magnetic layer on a base and a second magnetic layer over the first magnetic layer, the second magnetic layer containing magnetic particles having an average particle length (long axis diameter) of not more than to $0.35\mu$, the coercive force of which being from 660 to 760 oersteds, and the ratio of the coercive force of the upper or second layer to that of the lower or first magnetic layer being 1.1/1 to 1.6/1.

The magnetic particles used in the upper magnetic layer of the magnetic recording medium of the present invention are preferably fine magnetic particles having an average particle length (long axis diameter) of not more than $0.35\mu$ so that there is obtained sufficient low noise, high charging degree in the magnetic layer and high output, particularly, in the high frequency band. The magnetic particles used in the lower magnetic layer of the present magnetic medium are preferably magnetic particles having an average particle length (long axis diameter) of from 0.4 to $0.7\mu$, so that there is obtained sufficient high output at the low frequency band. When the magnetic particles of the lower magnetic layer have an average particle length of less than $0.4\mu$, the magnetic recording medium shows insufficient output at the low frequency band because of the poor orientation of magnetic particles.

When the particle size of magnetic particles becomes small, noise level is decreased but the charging degree or output becomes poor. Thus, the magnetic particles used in the upper magnetic layer of the present magnetic medium have preferably an average particle length of not more than $0.35\mu$, more preferably from 0.15 to $0.35\mu$.

The magnetic recording medium obtained by using such magnetic particles has preferably a coercive force of 660 to 760 oersteds in the upper layer and the ratio of coercive force of the upper layer to that of the lower magnetic layer (i.e. the coercive force of upper magnetic layer/the coercive force of the lower magnetic layer) in the range of 1.1/1 to 1.6/1, so that there are obtained improved sensitivity and frequency characteristics at both the low and high frequency bands, and there is no slack with respect to the curve of frequency characteristics at the medium band with no adverse effect upon erasing characteristics. When the coercive force of the upper magnetic layer is less than 660 oersteds, there cannot be obtained a sufficient output. On the other hand, when the coercive force of the upper magnetic layer is more than 760 oersteds, there is an adverse effect upon the erasing characteristics. Further, when the ratio of the coercive force of the upper magnetic layer to that of the lower magnetic layer is less than 1.1, there cannot be obtained sufficient output at both the low and medium frequency bands. On the other hand, when the ratio is more than 1.6, the curve of the frequency characteristics slacks at medium band, that is, the frequency characteristics at the medium band drops.

It has been found that the coercive force of the upper magnetic layer of the magnetic recording medium has a direct effect upon the output at the high frequency band, while on the other hand, when the coercive force is too high, the magnetic recording medium has difficulty with erasing. Such an effect is more significant when the average particle length of the magnetic particles is smaller. When the coercive force exceeds a certain limitation, there is experienced an adverse effect upon the erasing characteristics and sensing through hearing because of too high an output at the high frequency band. Thus, it has been found that the upper magnetic layer has preferably a coercive force of from 660 to 760 oersteds, more preferably 680 to 740 oersteds.

In FIG. 1, graph 1a shows frequency characteristics when the coercive force of the lower layer is adjusted to the ratio of the coercive force of the upper magnetic layer to that of the lower magnetic layer of about 1.4 by adjusting the coercive force of the upper magnetic layer to 720 oersteds, average particle length of the $\gamma$-Fe$_2$O$_3$ containing Co in the upper and lower magnetic layers to 0.25 and 0.5$\mu$ respectively, and the thicknesses of the upper and lower magnetic layers to 2.5 and 3.0$\mu$ respectively. Graph 1b shows frequency characteristics of the same magnetic recording medium except that the ratio of the coercive force of the upper layer to that of the lower magnetic layer is adjusted to about 1.8 by changing the coercive force of the lower magnetic layer alone. Likewise, graph 1c shows frequency characteristics at the ratio of the coercive force of the upper magnetic layer to that of the lower magnetic layer of about 1.0.

As is clear from FIG. 1, when the ratio of the coercive force of the upper layer/the coercive force of the lower layer is 1.8/1 (graph 1b), the curve of frequency characteristics may slack considerably at the medium frequency band. On the other hand, when the ratio is 1.0 (graph 1c), the output level at the low frequency band is insufficient and this spoils the effect of the two magnetic layer structure. To the contrary, the magnetic recording medium having the ratio of the coercive force of the upper magnetic layer/the coercive force of the lower magnetic layer of 1.4 (graph 1a) shows no slack in the curve of the frequency characteristics and a high output level over the entire frequency bands. As the result of various experiments, it has been found that the coercive force of the upper and lower magnetic layers are preferably in the ratio of the coercive force of the upper magnetic layer to that of the lower magnetic layer of 1.1/1 to 1.6/1, more preferably 1.2/1 to 1.5/1.

Figure 2:
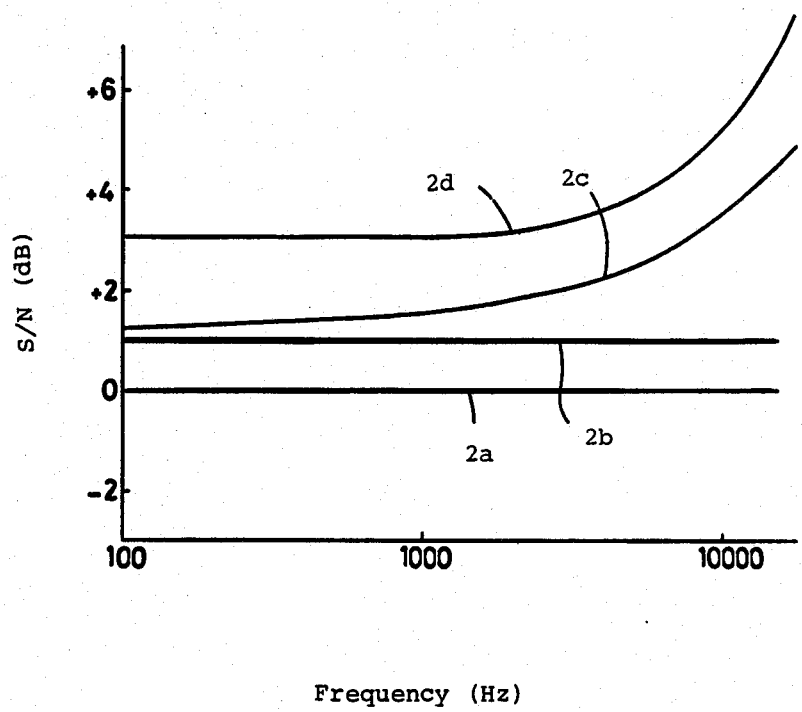
FIG. 2 shows the relation between the S/N and frequency of magnetic recording medium having single or two magnetic layers containing magnetic particles of various particle sizes.

FIG. 2 shows a relation between the S/N and frequency when various magnetic particles having different particle sizes are employed in both the upper magnetic layer (thickness: 2.5$\mu$) and the lower magnetic layer (thickness: 3.0$\mu$) or in single magnetic layer (thickness: 5.5$\mu$). In FIG. 2, graph 2a shows a relation between the S/N and frequency when the magnetic recording medium has a single magnetic layer which contains Co containing $\gamma$-Fe$_2$O$_3$ particles having an average particle length of 0.5$\mu$ and has a coercive force of 600 oersteds. Graph 2b *shows the relation when the magnetic recording medium having two magnetic layers wherein the upper magnetic layer contains Co containing $\gamma$-Fe$_2$O$_3$ particles having an average particle length of* 0.25$\mu$ and the lower magnetic layer contains Co containing $\gamma$-Fe$_2$O$_3$ particles having an average particle length of 0.5$\mu$ the coercive force of both upper and lower magnetic layers being 600 oersteds (ratio: 1/1). Graph 2c shows the relation when the magnetic recording medium having two magnetic layers wherein both the upper and lower magnetic layers contain Co containing $\gamma$-Fe$_2$O$_3$ particles having an average particle length of 0.5$\mu$, and the coercive forces of the upper and lower magnetic layers are 720 and 510 oersteds, respectively (ratio: about 1.4/1). Graph 2d shows the relation, when the magnetic recording medium having two magnetic layers wherein the upper magnetic layer contains Co containing $\gamma$-Fe$_2$O$_3$ particles having an average particle length of not more than 0.25$\mu$ and the lower magnetic layer contains Co containing $\gamma$-Fe$_2$O$_3$ particles having an average particle length of 0.5$\mu$, the coercive forces of the upper and lower magnetic layers are 720 and 510 oersteds, respectively (ratio: about 1.4/1). As is clear from FIG. 2, the magnetic recording medium which is obtained by using $\gamma$-Fe$_2$O$_3$ particles having an average particle length of 0.25$\mu$ in the upper magnetic layer and $\gamma$-Fe$_2$O$_3$ particles having an average particle length of 0.5$\mu$ in the lower magnetic layer has an excellent S/N ratio. Particularly, the magnetic recording medium which has the upper and lower magnetic layers having coercive forces of 720 and 510 oersteds respectively (ratio: about 1.4/1) shows a remarkably excellent S/N ratio.

Figure 3:
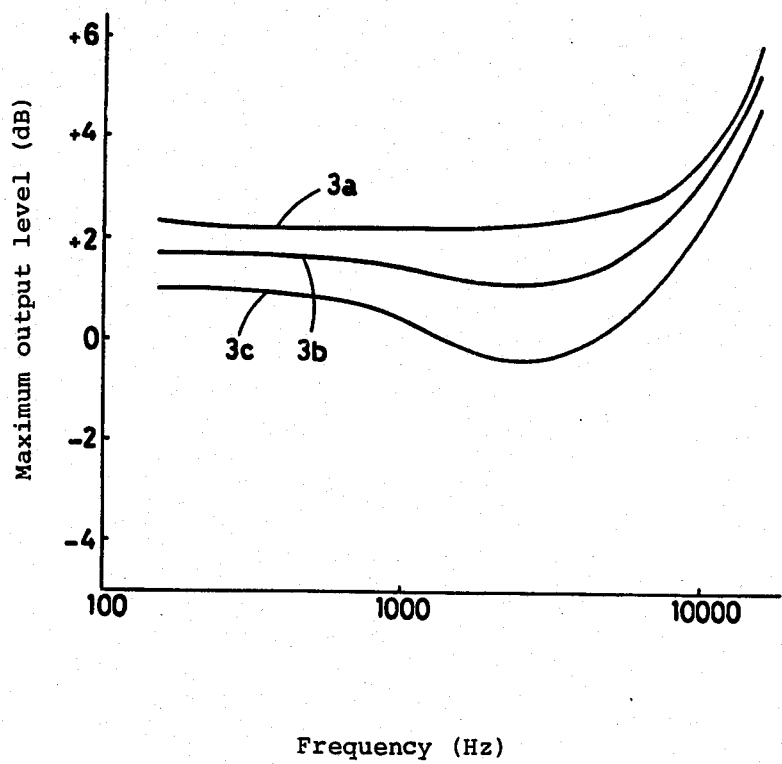
FIG. 3 shows the relation between the maximum output level and frequency at various remanent magnetic flux densities of the upper layer.

FIG. 3 shows a relation between a maximum output level (M.O.L.) and frequency at various remanent magnetic flux densities. In these magnetic recording mediums having two magnetic layers, each lower magnetic layer contains Co containing $\gamma$-Fe$_2$O$_3$ magnetic particles having an average particle length of 0.5$\mu$ and has a coercive force of 510 oersteds and a layer thickness of 3.0$\mu$. On the other hand, each $\gamma$-Fe$_2$O$_3$ magnetic particles having an average particle length of 0.25$\mu$ and a layer coercive force of 720 oersteds, a thickness of 2.5$\mu$ and different remanent magnetic flux density i.e., 1600 gauss (graph 3a), 1300 gauss (graph 3b) or 1000 gauss (graph 3c). As is clear from FIG. 3, when the remanent magnetic flux density of the upper magnetic layer is decreased to less than 1300 gauss, the M.O.L.-frequency curves slack gradually at the medium frequency upper magnetic layer contains Co containing band. Thus, the upper magnetic layer has preferably a remanent magnetic flux density of not less than 1300 gauss, more preferably not less than 1600 gauss.

Thus, the magnetic recording medium having an improved S/N ratio can be obtained by using magnetic particles having an average particle length of 0.15 to 0.35$\mu$ in the upper magnetic layer and magnetic particles having an average particle length of 0.4 to 0.7$\mu$ in the lower magnetic layer, adjusting the coercive force of the upper magnetic layer to from 660 to 760 oersteds and the ratio of the coercive force of the upper layer to that of the lower magnetic layer from 1.1/1 to 1.6/1.

Regarding the total thickness of the combined magnetic layers of from 5.0 to 5.5μ, it is preferable that the thickness of the upper magnetic layer be within the range of 1.5 to 3.0μ, while the thickness of the lower magnetic layer is in the range of 2.5 to 4.0μ. When the thickness of the upper magnetic layer is too large in comparison with that of the lower magnetic layer the magnetic recording medium shows an inferior output level at both the low and medium frequency bands, and on the other hand, when the thickness of the upper magnetic layer is too small in comparison with that of the lower magnetic layer, the magnetic recording medium shows low output level at the high frequency band and the noise is insufficiently lowered.

FIG. 4 shows the relation between noise level or output level and the ratio of thickness of the upper layer to that of the lower magnetic layer at high (12500 Hz) and low (315 Hz) frequency bands. In these magnetic mediums, the total thicknesses of the upper and lower magnetic layers are 5.5μ and the ratios of the thicknesses are varied. As is clear from FIG. 4, when the thickness of the upper magnetic layer is more than 3μ, the magnetic recording medium shows improved noise level but remarkably inferior output level at both the low and medium bands, while on the other hand when the thickness of the upper magnetic layer is less than 1.5μ, the magnetic recording medium shows low output level at a high frequency band and also increased noise. Thus, it is preferable that the thickness of the upper magnetic layer be in the range of from 1.5 to 3.0μ, preferably 1.7 to 2.8μ, the thickness of from the lower magnetic layer is in the range of 2.5 to 4.0μ.

The magnetic particles which are employed in the upper and lower magnetic layers include all conventional magnetic particles, such as $\gamma$-$Fe_2O_3$ particles, $Fe_3O_4$ particles, $\gamma$-$Fe_2O_3$ particles containing Co, $Fe_3O_4$ particles containing Co, and the like.

These upper and lower magnetic layers can be formed by a conventional method. For example, a magnetic paint composition containing magnetic particles having an average particle length (long axis diameter) of from 0.4 to 0.7μ, a binder resin, an organic solvent and other convention additives is applied onto a base film such as a polyester film in a usual manner and then dried the composition forming the lower magnetic layer, and thereafter, another magnetic paint composition containing magnetic particles having an average particle length (long axis diameter) of not more than 0.35μ, a binder resin, an organic solvent and other conventional additives applied onto the lower magnetic layer in a usual manner and then dried the latter composition forming the upper magnetic layer.

The binder resin employed in the upper and lower magnetic layers includes all conventional binder resins, such as a vinyl chloride-vinyl acetate copolymer, polyvinylbutyral resin, cellulose resin, isocyanate compound, and the like.

Suitable examples of the organic solvent employed in the present invention include methyl isobutyl ketone, methyl ethyl ketone, cyclohexanone, toluene, ethyl acetate, tetrahydrofuran, dimethyl formamide, and the like. These organic solvents may be used alone or in combination. The magnetic paint composition may also contain other conventional additives such as dispersing agents, lubricating agents, polishing agents, anti-static agents, or the like.

PREFERRED EMBODIMENTS

The present invention is illustrated by the following Example but should not be construed to be limited thereto.

EXAMPLE 1

Preparation of a magnetic paint composition for a lower magnetic layer:

| Ingredients | Parts by weight |
| --- | --- |
| $\gamma$-$Fe_2O_3$ Particles Containing Co (average particle length: 0.5μ) | 83 |
| VAGH (vinyl chloride-vinyl acetate-vinyl alcohol copolymer, manufactured by U.C.C.) | 9 |
| Polyurethane elastomer | 8 |
| Lecitin | 1 |
| Colonate L (trifunctional low molecular weight isocyanate compound, manufactured by Nippon Polyurethane Kogyo K.K.) | 3 |
| Toluene | 50 |
| Methyl isobutyl ketone | 50 |

The above ingredients are mixed with a ball mill to prepare a magnetic paint composition for a lower magnetic layer.

Preparation of a magnetic paint composition for an upper magnetic layer:

| Ingredients | Parts by weight |
| --- | --- |
| $\gamma$-$Fe_2O_3$ Particles containing Co (average particle length: 0.25μ) | 80 |
| VAGH | 11 |
| Polyurethane elastomer | 6 |
| Lecitin | 1 |
| Colonate L | 3 |
| Toluene | 50 |
| Methyl isobutyl ketone | 50 |

The above ingredients are mixed with a ball mill to prepare a magnetic paint composition for an upper magnetic layer.

Preparation of a magnetic tape having two magnetic layers:

The magnetic paint composition for a lower magnetic layer prepared above is applied onto a polyester film (thickness: about 12μ), and dried the composition. After surface-treatment, the coated composition is cured to form a lower magnetic layer (thickness: 3.0μ). Onto the lower magnetic layer is applied the magnetic paint composition for an upper magnetic layer prepared above and then it is dried. By subjecting to surface-treatment and curing likewise, there is formed an upper magnetic layer (thickness: 2.5μ). The resulting product is cut in a desired width to obtain a magnetic tape having two magnetic layers. The resulting magnetic tape having two layers composed of the lower layer having a coercive force of 510 oersteds and remanent magnetic flux density of 1800 gauss, and the upper layer having a coercive force of 720 oersteds and remanent magnetic density of 1300 gauss.

As to the magnetic tape obtained in Example 1, the output level and S/N characteristics at various frequencies were measured to obtain frequency characteristics. These results are shown in the accompanying FIG. 1 (graph 1a) and FIG. 2 (graph 2d).

As is clear from these figures, that the magnetic recording mediums of the present invention showed no slack of the curve of frequency characteristics at the medium frequency band, improved frequency characteristics and sensitivity over the entire frequency bands, and also substantially less noise as well as harmonious tone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium for audio recording which comprises a base, a lower magnetic layer containing magnetic particles having an average particle length (long axis diameter) of from 0.4 to 0.7μ provided on said base, and an upper magnetic layer containing magnetic particles having an average particle length (long axis diameter) of not more than 0.35μ provided over said lower magnetic layer, the coercive force of said upper magnetic layer being from 660 to 760 oersteds, the ratio of the coercive force of the upper layer to that of the lower layer being 1.2/1 to 1.5/1.

2. A magnetic recording medium according to claim 1, wherein the coercive force of said upper magnetic layer is from 680 to 740 oersteds.

3. A magnetic recording medium according to claim 1, wherein said upper magnetic layer contains magnetic particles having an average magnetic layer contains magnetic particles having an average particle length (long axis diameter) of from 0.15 to 0.35μ.

4. The audio magnetic recording medium of claim 1, wherein a combined total thickness of the lower and upper magnetic layers ranges from 5.0 to 5.5 microns.

5. The audio magnetic recording medium 1, wherein thickness of said upper magnetic layer is from 1.5 to 3.0 microns and thickness of said lower magnetic layer is from 2.5 to 4.0 microns.

* * * * *